United States Patent [19]

Behr et al.

[11] Patent Number: 5,354,877

[45] Date of Patent: Oct. 11, 1994

[54] CATALYTIC HYDROGENATION OF POLYUNSATURATED FATTY ACIDS OR DERIVATIVES USING A PALLADIUM/CARBONIC ACID CATALYTIC COMPLEX

[75] Inventors: Arno Behr, Duesseldorf; Christoph Lohr, Dortmund; Bernd Ellenberg, Neuss, all of Fed. Rep. of Germany

[73] Assignee: Henkel Kommanditgesellschaft auf Aktien, Duesseldorf, Fed. Rep. of Germany

[21] Appl. No.: 119,078

[22] PCT Filed: Mar. 12, 1992

[86] PCT No.: PCT/EP92/00542

§ 371 Date: Nov. 19, 1993

§ 102(e) Date: Nov. 19, 1993

[87] PCT Pub. No.: WO92/16605

PCT Pub. Date: Oct. 1, 1992

[30] Foreign Application Priority Data

Mar. 21, 1991 [DE] Fed. Rep. of Germany ....... 4109246

[51] Int. Cl.$^5$ ............................................. C07C 51/36
[52] U.S. Cl. ..................... 554/115; 554/141; 560/205
[58] Field of Search ................ 554/145, 141; 560/205

[56] References Cited

U.S. PATENT DOCUMENTS

| | | | |
|---|---|---|---|
| 4,353,835 | 10/1982 | Swift | 554/145 |
| 4,398,039 | 8/1983 | Pesa et al. | 560/265 |
| 4,481,147 | 11/1984 | Hofmann | 554/145 |

FOREIGN PATENT DOCUMENTS

| | | |
|---|---|---|
| 0253416 | 1/1988 | European Pat. Off. . |
| 1239474 | 4/1967 | Fed. Rep. of Germany . |
| 3502548 | 9/1986 | Fed. Rep. of Germany . |
| 4012873 | 10/1991 | Fed. Rep. of Germany . |
| 0066893 | 7/1973 | Luxembourg . |

OTHER PUBLICATIONS

Aus. J. Cat., 24, 536 (1972).
Izv. Akad. Nauk SSSR, Ser. Khim., 3, 642 (1979).

*Primary Examiner*—José G. Dees
*Assistant Examiner*—Deborah D. Carr
*Attorney, Agent, or Firm*—Ernest G. Szoke; Wayne C. Jaeschke; John E. Drach

[57] ABSTRACT

Mono-unsaturated fatty acids or their derivates are produced by hydrogenating poly-unaturated fatty acids or their derivates at 0° to 150° C., in a pressure range from 800 to 1500 hPa, with hydrogen and in the presence of a catalyst system that contains: a) a palladium salt and b) a carbonic acid ester, as well as, if necessary, c) a base for neutralizing the acids formed during the reduction of the palladium salt, d) water and/or a water-immiscible, inert solvent.

7 Claims, No Drawings

CATALYTIC HYDROGENATION OF POLYUNSATURATED FATTY ACIDS OR DERIVATIVES USING A PALLADIUM/CARBONIC ACID CATALYTIC COMPLEX

BACKGROUND OF THE INVENTION

1. Field of the Invention

This invention relates to a process for the production of monounsaturated fatty acids or derivatives thereof by catalytic hydrogenation of polyunsaturated fatty acids or derivatives thereof.

2. Statement of Related Art

Technical fatty acids or fatty acid derivatives having high oleic acid contents, for example of more than 60% or more than 70%, are starting materials in great demand for products of the cosmetic industry, the oil production industry, the textile industry and for many other applications.

The industrial processes hitherto used for the partial hydrogenation of fatty acids and their derivatives lack selectivity and are difficult to carry out. Hitherto, the processes in question have mostly been carried out with heterogeneous nickel catalysts at high temperatures in the range from 120° to 180° C. In processes involving the throughflow of hydrogen, pressures of up to 3 bar are applied. In so-called "dead-end" processes, pressures in the range from 1 to 3 MPa (10 to 30 bar) are applied. Unfortunately, these processes lack selectivity in regard to the oleic acids formed and, instead, give technical fatty acid cuts with considerable amounts of saturated fatty acids, particularly stearic acid, which are troublesome in many industrial applications and have to be removed from the oleic acid cuts at considerable expense.

The hydrogenation of linoleic acid methyl ester with nickel catalysts is described in Izv. Akad. Nauk SSSR, Ser. Khim. 3, 642 (1979). Before the reaction, the catalyst has to be subjected to a complicated activation process lasting several hours. This process cannot be carried out on an industrial scale on account of the unfavorable educt-to-catalyst ratio of 25:1. In addition, the hydrogenation is not selective; in nickel/ methyl formamide systems, 12% methyl stearate is formed as secondary product; in nickel/dimethyl acetamide systems, 15% methyl stearate is formed as secondary product.

Finally, it is known from J. Cat., 24,536 (1972) that fatty acid derivatives can be hydrogenated in the presence of complexes of a transition metal and an aprotic amidic solvent, for example dimethyl formamide. However, the rhodium and nickel catalysts described in this reference also have to be subjected before the reaction to a very complicated pretreatment with equimolar quantities of the expensive reducing agent, sodium boranate. However, the process in question cannot be carried out on an industrial scale because it requires extremely large quantities of catalyst. Where rhodium is used as the catalyst, a maximum educt-to-catalyst ratio of 10:1 is possible whereas, where nickel is used as catalyst, a corresponding ratio of only 5:1 is possible. In addition, in the production of unsaturated fatty acids for applications in the cosmetics industry and in the food industry, there is the disadvantage that the use of amide-containing complexing agents is undesirable on ecotoxicological grounds.

Accordingly, the problem addressed by the present invention was to provide a process for the production of monounsaturated fatty acids or derivatives thereof which would be free from the disadvantages described above.

DESCRIPTION OF THE INVENTION

The present invention relates to a process for the production of monounsaturated fatty acids or derivatives thereof by catalytic hydrogenation of polyunsaturated fatty acids or derivatives thereof, characterized in that polyunsaturated fatty acids or derivatives thereof are hydrogenated with hydrogen at temperatures of 0° to 150° C., under a pressure in the range from 800 to 1500 hPa and in the presence of a catalyst system containing a) a palladium salt and
b) a carbonic acid ester and optionally c) a base for neutralization of the acid formed during reduction of the palladium salt,
d) water and/or inert water-immiscible solvents.

The process according to the invention may be carried out a room temperature and at normal hydrogen pressures, is distinguished by small quantities of catalyst and short reaction times and leads selectively to the monounsaturated fatty acids, avoiding the formation of completely saturated products. The process according to the invention may be carried out in typical stirred reactors, the catalyst readily being removed by phase separation on completion of the reaction. Accordingly, the catalyst may be recovered without difficulty and reused. The catalyst is resistant to catalyst poisons, so that fatty acids or derivatives thereof in various qualities may be used in the hydrogenation reaction. The carbonic acid esters used for activation are ecotoxicologically safe, so that the end products also meet the strict requirements which cosmetic raw materials and foods are expected to satisfy. Finally, the process according to the invention provides access to fatty compounds of high elaidic acid content.

Suitable starting materials for the process according to the invention are fatty acids of the following origin or derivatives thereof: soybean oil, sunflower oil, palm kernel oil, cottonseed oil, fish oil, tall oil, peanut oil, linseed oil, corn oil, olive oil, rapeseed oil, beef tallow or lard. The process is of particular interest for fatty compounds of natural renewable raw materials which, in addition to an already high oleic acid content, also have relatively high contents of linoleic acid and/or linolenic acid. Since the oleic acid present in these materials is not hydrogenated in the process according to the invention, fatty acid cuts of which the oleic acid and oleic acid isomer content is made up of the sum of the oleic acid originally present and the selectively hydrogenated linoleic acid (including hydrogenated fatty acids with relatively high degrees of unsaturation, such as linolenic acid) are ultimately obtained. Both the free fatty acids and their esters, such as the methyl esters or ethyl esters, and also triglycerides and amides of these acids and unsaturated fatty alcohols obtainable by selective hydrogenation of corresponding fatty acid methyl esters may be used in the process according to the invention.

Palladium salts suitable for use in the process according to the invention are, for example, halides, pseudohalides, acetates, acetyl acetonates and other salts and complexes typically used in the field of catalysis. Particular preference is attributed to palladium dichloride which may be used together with alkali metal halides for the formation of complexes with improved solubility in the reaction system, a complex having the composition $Na_2PdCl_4$ being formed, for example, with NaCl.

The catalyst system used in accordance with the invention is normally converted into an activated form by reduction with hydrogen before addition of the unsaturated fatty acids or fatty acid derivatives. However, the catalyst system may also be activated in the presence of the unsaturated fatty acids or fatty acid derivatives.

Carbonic acid esters suitable for use as activators are compounds corresponding to formula (I):

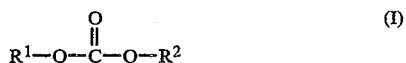

in which $R^1$ is a $C_{1-4}$ alkyl radical and $R^2$ is hydrogen or has the same meaning as $R^1$, or to formula (II):

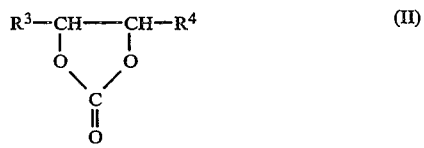

in which $R^3$ and $R^4$ independently of one another represent a hydrogen atom or a $C_{1-4}$ alkyl radical. It is particularly preferred to use ethylene carbonate and 1,2-propylene carbonate. Both the open-chain carbonic acid esters and the cyclic carbonic acid esters are known substances which may be obtained by the relevant methods of preparative organic chemistry.

The bases to be added to the catalyst systems are merely used to neutralize the acids formed during activation of the catalyst with hydrogen and are generally employed in stoichiometric quantities, based on the quantities of acid to be expected. Suitable bases are, for example, oxides, hydroxides or carbonates of alkali metals or alkaline earth metals, particularly sodium carbonate, either in bulk or even in aqueous solution.

The quantity of water optionally added to the catalyst system is not critical. A relatively large addition of water may be desirable in cases where the reaction system is intended to separate immediately after hydrogenation into a two-phase system with the hydrogenated product in one of the phases. For example, it is of particular advantage to use 1,2-propylene carbonate containing 0.1 to 1 part by volume water.

The inert water-miscible solvents optionally used in the process according to the invention do not affect the hydrogenation reaction, but are merely intended to form a two-phase system in the reaction mixture to facilitate removal of the reaction products on completion of the hydrogenation. It is best to use solvents which can easily be removed by distillation, for example saturated hydrocarbons, such as hexane or octane or mixtures thereof.

In one preferred embodiment of the invention, the palladium salt and the fatty acids or their derivatives are used in molar ratios of 1:5 to 1:20,000 and, more particularly, in molar ratios of 1:1,000 to 1:5,000.

In another advantageous embodiment of the invention, the palladium salt and the carbonic acid ester are used in molar ratios of at least 1:10, although the the activator may be used in a slight excess which, depending on its boiling point, may also serve as solvent for the starting material. A molar ratio of palladium salt to carbonic acid ester of 1:1,000 to 1:100,000 is preferred for industrial applications.

The process according to the invention may be carried out at a reaction temperature in the range from 0° to 150° C. and is preferably carried out at a temperature in the range from 10° to 60° C. and, more preferably, at a temperature of 15° to 30° C.

The reaction time required for the process according to the invention is determined by the starting material, by the conditions under which the process is carried out and by the size of the reaction mixture and is typically between 5 minutes and 8 hours and, more particularly, between 10 minutes and 60 minutes. In the process according to the invention, hydrogen is basically available to the reaction system until the theoretical quantity of hydrogen has been taken up.

The hydrogenation pressure in the process according to the invention is in the range between a slightly subatmospheric and a slightly superatmospheric pressure. A pressure in the range from 800 to 1,500 hPa is particularly preferred. Ambient pressure is of course preferred from the point of view of the equipment used for the process.

The process according to the invention may be carried out in reactors of virtually any materials. Reactors which enable the reaction mixtures to be intensively stirred are preferred. Glass reactors are advantageously used insofar as they enable the reaction to be carried out under normal pressure.

A typical laboratory reactor for carrying out the process according to the invention consists of a 500 ml four-necked glass vessel equipped with a feed opening, a thermometer, a stirrer and a reflux condenser. Typical laboratory stirrers are used as the stirrer, blade stirrers or propeller stirrers being particularly preferred. The preferred rotational speed of the stirrer is between 400 and 1200 revolutions per minute and, more particularly, 700 to 900 revolutions per minute. The outlet of the reflux condenser may be connected to a measuring burette with pressure equalization into which the necessary quantity of hydrogen is introduced. The reactor can be evacuated through a three-way cock and filled with hydrogen or nitrogen or argon. The measuring burette is filled with hydrogen. If necessary, the reactor may be thermostatically controlled by means of an oil bath or water bath.

One example of a typical pilot-scale reactor is a 60 liter stirred reactor with connections for hydrogen, nitrogen, vacuum, liquid, a safety valve, a temperature control system, a stirrer and a bottom outlet valve. To ensure optimal distribution in the reactor, the hydrogen is introduced into the reactor through an annular nozzle below the lowermost stirring element. Stirring may be carried out with Intermig stirring elements at a stirrer speed of 50 to 500 r.p.m. and, more particularly, at a stirrer speed of 350 to 450 r.p.m. If necessary, the reactor may be thermostatically controlled through a double jacket. The hydrogen feed pipe is equipped with pressure and throughflow regulators which provide for integration of the volume of hydrogen introduced. The object of this integration of the hydrogen is to determine the end of the reaction. The stirred reactor described above is used both for preparing the catalyst solution, for activating it by reduction with hydrogen, for carrying out the reaction and for phase separation after the reaction. The catalyst phase and the product phase may be run off into different collecting vessels through the bottom outlet valve. If necessary, the catalyst phase may be recirculated to the stirred reactor through a pipe for the next reaction cycle.

The following Examples are intended to illustrate the invention without limiting it in any way.

EXAMPLES

Example 1

Production of the catalyst system. A solution containing 84.8 mg $PdCl_2$ and 54.9 mg NaCl (to form a complex of the composition $Na_2PdCl_4$) in 50 ml propylene carbonate was prepared. The components were dissolved by stirring under nitrogen for 24 h (1 ml of the solution contained 1 mg palladium). A second solution of 0.995 g sodium carbonate in 250 ml distilled water was prepared at the same time.

Example 2

Selective hydrogenation of sunflower oil fatty acid. 2 ml of the palladium solution (2 mg = 18,8 μmol sodium carbonate) and 50 ml propylene carbonate were introduced into a glass autoclave. The pressure vessel was filled with hydrogen and the catalyst was preactivated with stirring (800 r.p.m.) for 5 minutes at 25° C. A brownish solution of the catalyst was obtained. 10 g sunflower oil fatty acid having the composition: linoleic acid 63.0% by weight, oleic acid 28.0% by weight, stearic acid 1.6% by weight, were then introduced into the solution by syringe. The reaction vessel was connected to the hydrogen burette which contained the calculated stoichiometric quantity of hydrogen.

After the reaction, a homogeneous solution was present and could be separated in two phases by addition of n-hexane. The lower propylene carbonate phase contained the catalyst; it was recirculated. The upper organic phase contained the product which was isolated and analyzed by gas chromatography.

| Characteristic data of the product: | |
|---|---|
| Linoleic acid | 0.0% by weight |
| Oleic acid/elaidic acid | 87.2% by weight |
| Stearic acid | 4.8% by weight |

After a total reaction time of 34 minutes, the molar ratio of oleic acid to elaidic acid in the reaction product was 1:1.5.

Example 3

The procedure was as in Example 2, except that the reaction temperature was increased to 70° C.

| Characteristic data of the product: | |
|---|---|
| Linoleic acid | 0.0% by weight |
| Oleic acid/elaidic acid | 89.6% by weight |
| Stearic acid | 4.8% by weight |

After a total reaction time of 20 minutes, the molar ratio of oleic acid to elaidic acid in the reaction product was 1:1.9.

Example 4

The procedure was as described in Example 2, except that the reaction temperature was increased to 100° C.

| Characteristic data of the product: | |
|---|---|
| Linoleic acid | 0.0% by weight |
| Oleic acid/elaidic acid | 90.0% by weight |
| Stearic acid | 4.8% by weight |

After a total reaction time of 12 minutes, the molar ratio of oleic acid to elaidic acid in the reaction product was 1:2.1.

Example 5

Example 2 was repeated using 10 g rapeseed oil. Content of fatty acids in the rapeseed oil:

| | |
|---|---|
| Linoleic acid | 23.5% by weight |
| Oleic acid | 64.0% by weight |
| Stearic acid | 1.0% by weight |

| Characteristic data of the product: | |
|---|---|
| Linoleic acid | 0.9% by weight |
| Oleic acid/elaidic acid | 84.8% by weight |
| Stearic acid | 7.0% by weight |

After a total reaction time of 46 minutes, the molar ratio of oleic acid to elaidic acid in the reaction product was 1:1.9.

Example 6

Example 2 was repeated using 10 g rapeseed oil methyl ester. Content of fatty acids in the ester:

| | | |
|---|---|---|
| Linoleic acid | 23.5% by weight | 0.5% by weight |
| Oleic acid/elaidic acid | 66.0% by weight | 86.0% by weight |
| Stearic acid | 1.5% by weight | 5.0% by weight |

| Characteristic data of the fatty acid component of the product: | |
|---|---|
| Linoleic acid | 0.5% by weight |
| Oleic acid/elaidic acid | 86.0% by weight |
| Stearic acid | 5.0% by weight |

After a reaction time of 90 minutes, the ratio of oleic acid to elaidic acid in the product was 1:1.9.

Example 7

Example 1 was repeated using 50 ml ethylene carbonate as solvent.

| Characteristic data of the product: | |
|---|---|
| Linoleic acid | 0.0% by weight |
| Oleic acid/elaidic acid | 91.6% by weight |
| Stearic acid | 3.6% by weight |

After a total reaction time of 110 minutes, the molar ratio of oleic acid to elaidic acid in the reaction product was 1:1.6.

What is claimed is:

1. A process for the production of a monounsaturated fatty acid or a derivative thereof comprising reacting a polyunsaturated fatty acid or derivative thereof with hydrogen at a temperature of from about 0° C. to about 150° C. and under a pressure of from about 800 hPa to about 1500 hPa in the presence of a catalyst comprised of a palladium salt and a carbonic acid ester.

2. The process of claim 1 wherein aid catalyst is activated by reaction with hydrogen in the presence of an aqueous solution of a base prior to reaction of said polyunsaturated fatty acid or derivative thereof with hydrogen.

3. The process of claim 1 wherein said carbonic acid ester has the formula (I):

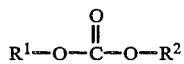   (I)

wherein $R^1$ is a $C_{1-4}$ alkyl radical and $R^2$ is hydrogen or a $C_{1-4}$ alkyl radical.

4. The process of claim 1 wherein said carbonic acid ester has the formula (II):

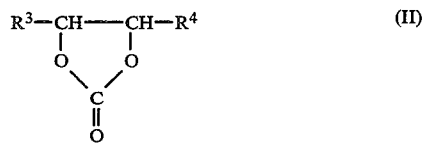   (II)

wherein each of $R^3$ and $R^4$ is hydrogen or a $C_{1-4}$ alkyl radical.

5. The process of claim 1 wherein molar ratio of said palladium salt to said fatty acid or derivative thereof is from about 1:5 to about 1:20,000.

6. The process of claim 1 wherein molar ratio of said palladium salt to said carbonic acid ester is at least 1:10.

7. The process of claim 1 wherein said process is carried out at temperature of from about 10° C. to about 60° C.

* * * * *